US008239819B2

(12) United States Patent
Hafermann et al.

(10) Patent No.: US 8,239,819 B2
(45) Date of Patent: Aug. 7, 2012

(54) METHOD AND SYSTEM FOR MANAGING THE LIFECYCLE OF A SERVICE ORIENTED ARCHITECTURE

(75) Inventors: Udo Hafermann, Darmstadt (DE); Harald Schöning, Dieburg (DE); Ulrich Post, Seeheim (DE)

(73) Assignee: Software AG, Darmstadt (DE)

( * ) Notice: Subject to any disclaimer, the term of this patent is extended or adjusted under 35 U.S.C. 154(b) by 1432 days.

(21) Appl. No.: 11/766,197

(22) Filed: Jun. 21, 2007

(65) Prior Publication Data

US 2008/0066048 A1 Mar. 13, 2008

(30) Foreign Application Priority Data

Sep. 11, 2006 (EP) .................................... 06018965

(51) Int. Cl.
*G06F 9/44* (2006.01)
(52) U.S. Cl. .................. 717/100; 717/101; 717/102
(58) Field of Classification Search .................. 717/120, 717/121, 140, 101, 102
See application file for complete search history.

(56) References Cited

U.S. PATENT DOCUMENTS

| 7,222,302 | B2 * | 5/2007 | Hauser et al. ................. 715/734 |
| 7,266,600 | B2 * | 9/2007 | Fletcher et al. ............... 709/223 |
| 7,725,469 | B2 * | 5/2010 | Colgrave et al. ............. 707/736 |
| 7,739,228 | B1 * | 6/2010 | Erickson et al. ............. 707/602 |
| 7,757,268 | B2 * | 7/2010 | Gupta et al. ........................ 726/1 |
| 7,814,142 | B2 * | 10/2010 | Mamou et al. ............... 709/203 |
| 7,814,470 | B2 * | 10/2010 | Mamou et al. ............... 717/162 |
| 2005/0222931 | A1 * | 10/2005 | Mamou et al. ................. 705/35 |
| 2007/0204017 | A1 * | 8/2007 | Maes ............................. 709/223 |
| 2008/0126147 | A1 * | 5/2008 | Ang et al. .......................... 705/7 |

OTHER PUBLICATIONS

Cox et al., "Management of the service-oriented-architecture life cycle", 2005, IBM System Journal, vol. 44, No. 4.*
Nnaji et al., "Cost-Effective Product Relization: Service-Oriented Architecture for Integrated Product Life-Cycle Management", 2004.*
Abecker et al., "Analysis of Web Service Solutions and Frameworks", Mar. 26, 2004.*
Michael P. Papazoglou, "Service-Oriented Design and Development Methodology", 2006, IJWET.*
McCabe et al., "Grid Service Configuration and Lifecycle Management" 2005.*
Machiraju et al., "Technologies for Business-Driven IT Management", Jun. 7, 2004.*
Topolnik, Marko., et al. "Implementation of the ebXML Registry Client for the ebXML Registry Services", Jun. 11, 2003. Proceedings of the 7th International Conference on Jun. 11-13, 2003, Piscataway, New Jersey, pp. 551-556.
Najmi, Farrukh. "Web Content Management Using the OASIS ebXML Registry Standard", Feb. 2, 2004, Retrieved from the Internet: http://ebxmlrr.sourceforge.net/presentations/xml/Europe2004/40-02-02.pdf, retrieved on Dec. 19, 2006, 18 pages.

(Continued)

*Primary Examiner* — Phillip H Nguyen
(74) *Attorney, Agent, or Firm* — Meyertons Hood Kivlin Kowert & Goetzel, P.C.; Jeffrey C. Hood; Joel L. Steven

(57) ABSTRACT

Managing the lifecycle of a service oriented architecture (SOA). The method may include selecting a subset of a plurality of objects of the SOA for lifecycle management in accordance with the requirements of an organization implementing the SOA, and assigning a lifecycle property to each member of the subset of the plurality of objects of the SOA.

18 Claims, 6 Drawing Sheets

OTHER PUBLICATIONS

"About the OSGi Service Platform—Technical Whitepaper—Revision 3.0", Jul. 12, 2004, Retrieved from the Internet, http://www.osgi.org/documents/osgi_technology/osgi-sp-overview.pdf, Retrieved Feb. 9, 2006, 17 pages.

Dogac, Asuman, et al., "Artemis: Deploying semantically enriched Web services in the healthcare domain", Information Systems, Pergamon Press, Oxford, Great Britain, vol. 31, No. 4-5, Jun. 2006, pp. 321-339.

"Web Services Made Easier: The Java APIs and Architecture for XML", Oct. 31, 2001, http://web.archive.org/web/20011116112311/http://java.sun.com/xml/webservices.pdf, Retrieved from the Internet on Nov. 24, 2004, pp. 19-21.

Thompson, S.M., "Congfiguration management: keeping it all together", BT Techonology Journal, Springer, Dordrecht, NL, vol. 15, No. 3, Jul. 1997, pp. 48-60.

European search report for application No. EP 06 01 8965, search completed Apr. 2, 2007.

* cited by examiner

METHOD AND SYSTEM FOR MANAGING THE LIFECYCLE OF A SERVICE ORIENTED ARCHITECTURE

PRIORITY CLAIM

This application claims benefit of priority of European application No. EP 06 018 965.1 titled "Method And System For Managing The Lifecycle Of A Service Oriented Architecture", filed Sep. 11, 2006, and whose inventors are Udo Hafermann, Harald Schoning, and Ulrich Post.

TECHNICAL FIELD

The present invention relates to a method and a system for managing the lifecycle of a service oriented architecture (SOA).

BACKGROUND OF THE INVENTION

Services generally use standardized interfaces for exchanging data from one computer to another over a computer network, for example the Internet. An application may request data from a server over the computer network using a service provided by the server. Such a request is typically enclosed in a SOAP envelope, which is conveyed using HTTP, and may comprise XML in conjunction with other web-related standards. More technically advanced applications combine various services to obtain or process the desired data. A software architecture, which is developed around a plurality of services, e.g. web services on the Internet, is called a service oriented architecture (SOA).

In a SOA, resources are made available to participants in the network as independent services that the participants can access in a standardized way. Whereas most definitions of a SOA use SOAP requests conveyed via HTTP/HTTPS over TCP/IP, a SOA may use any web service-based technology. The web services interoperate based on formal definitions which are independent from the underlying platform and programming language. The interface definition encapsulates the specific implementations. A SOA is independent of a specific development technology (such as Java and .NET). The software components become very reusable because the interface is standards-compliant and is independent from the underlying implementation of the web service logic. For example, a C# (C Sharp) service could be used by a JAVA application and vice versa.

In a SOA, the registry plays a central role in managing the information about the SOA entities as well as other metadata such as policies (e.g. rules concerning the conditions of use or the performance of web services) associations between the SOA entities etc. This applies not only to an operating SOA but also to other phases of the lifecycle of the SOA. Thus, the information maintained in one or more registries will go through a lifecycle that may for example be oriented along the classical development cycle of software (inception, design, implementation, test, production etc.). However, what parts of the SOA are affected by changing from one phase of a lifecycle to the next will strongly depend on the processes established in the organization implementing its SOA. SOA architectures and their elements as they are disclosed in the prior art, do not provide the possibility for a customized lifecycle management but provide at best "one fits all" approaches for managing the lifecycle of the entities of the SOA, wherein a status indication is provided for each web service, which may reflect, whether a certain web service is operational or still tested.

Thus, lifecycle management of an SOA is desired.

SUMMARY OF THE INVENTION

In one aspect of the invention, a method for managing the lifecycle of a service oriented architecture (SOA) is provided. The method may include selecting a subset of a plurality of objects of the SOA for lifecycle management in accordance with the requirements of an organization implementing the SOA, and assigning a lifecycle property to each member of the subset of the plurality of objects of the SOA.

Instead of providing an inflexible lifecycle management for all entities of the SOA or a fixed subset thereof, a selection step may be provided, wherein a user can select objects of the SOA, which may be affected by the lifecycle of the SOA. An implementing organisation may, for example, decide that the objects to be provided with lifecycle properties are not web services but only parts thereof such as the respective message parts. Other objects which may be provided with a lifecycle property are associations or policies of the SOA, which may—depending on the particular implementation—change during the lifecycle.

Preferably, the first step comprises the step of selecting at least one object type of a plurality of object types of the SOA and wherein the second step comprises assigning a lifecycle property to each object of the SOA belonging to the selected object type. Rather than performing an individual selection of objects to be provided with a lifecycle property, all objects of a certain type are preferably provided with lifecycle properties. This feature facilitates the lifecycle management of a larger SOA comprising a greater number of objects.

If the subset selected in the first step includes an object comprising an aggregation of objects of the SOA, each of the aggregated objects may inherit the lifecycle property from the parent object. Again, this reduces the number of selection steps for managing the lifecycle of related objects.

In an embodiment, the method further comprises the step of defining in accordance with the requirements of an organization implementing the SOA at least one of a plurality of lifecycle states, which can be reflected by the lifecycle property. Accordingly, rather than restricting the implementing organisation to the use of a set of predefined phases for lifecycle management, it is possible to freely design, name and label (including the representation by an icon) different lifecycle states in a language and terminology which best meets the specific requirements of the implementing organisation. In some embodiments each lifecycle stage may comprise one or more lifecycle states which can be reflected by the lifecycle property. Distinguishing between stages and states provides a more structured management of the lifecycle. In some situations, each stage may correspond to a registry of its own comprising the objects of the SOA during the respective phase of the lifecycle.

In one embodiment, one or more of the defined lifecycle stages and/or states for a first object of the selected subset may be different from one or more of the defined lifecycle stages and/or states for a second object of the selected subset. Accordingly, the lifecycle management can in agreement with the requirements of the implementing organisation be tailored to the individual objects of the SOA, which may have been selected for lifecycle management.

According to a further aspect, the method comprises the step of defining in accordance with the requirements of an organization implementing the SOA at least one of a plurality of transition states reflected by the lifecycle property to which the lifecycle property of an object can change in the next step of the lifecycle of the object. The transition states therefore restrict to which state(s) in the lifecycle an object may change, wherein this change may depend on the approval of one or more authorized users of the implementing organization. Further, the lifecycle property can be adapted to effect a process in the SOA, such as the call of a Web service, during a transition from one state of the lifecycle to another.

In one embodiment, the first and the second step of the above described method may involve creating a JAXR taxonomy for at least one registry of the SOA. Other techniques for performing the described method are also conceivable and known to the person skilled in the art, such as using Semantic Modelling with OWL (Web Ontology Language) or RDF (Resource Description Framework), among others. Another approach is to provide lifecycle attributes for the objects of the SOA.

According to another aspect, a lifecycle management system for a SOA may be adapted to perform any of the above described methods. To this end, the lifecycle management system may include an API for managing the objects in one or more registries of the SOA. In one embodiment, the lifecycle management system may include a graphical user interface displaying the lifecycle properties of the selected subset of the pluralities of objects of the SOA.

BRIEF DESCRIPTION OF THE DRAWINGS

In the following detailed description, embodiments of the invention are further described with reference to the following figures.

Figure 1:
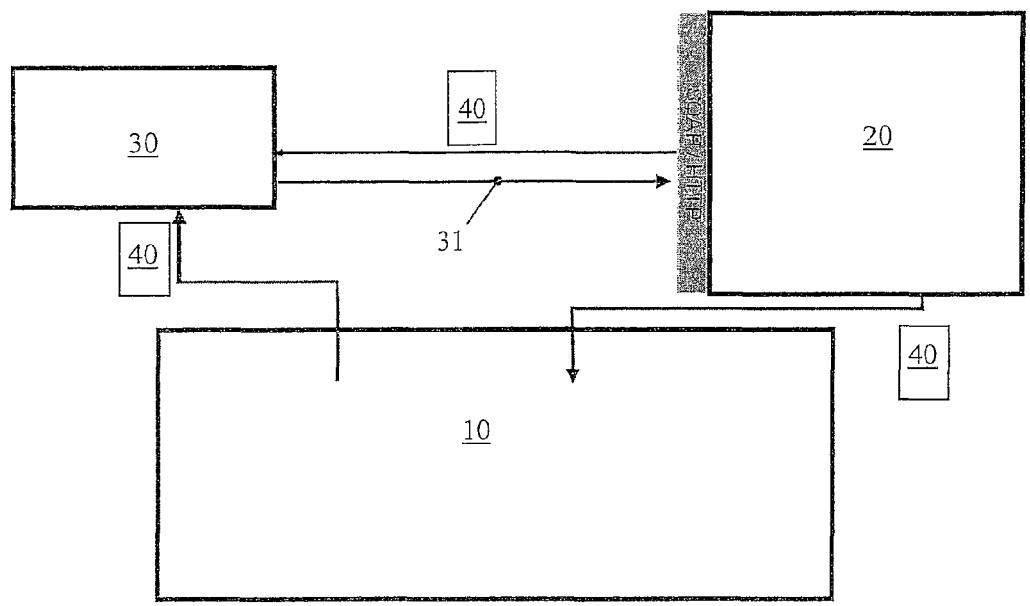
FIG. 1: A schematic representation of a simplified SOA and the registry for managing information relating to the SOA according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

In the following, embodiments are described with reference to one or more registries of an SOA. FIG. 1 schematically presents such a registry 10 and its relation to the entities of a SOA. An application 30 may issue a request 31 for a web service 20. To this end, the application 30 may need at first a description about the interface definitions of the web service 20. This description 40, which may for example be provided in the Web Service Definition Language (WSDL), can be obtained from a registry 10 (or directly from the web service 20). The registry 10 may include descriptions of all web services of the SOA, for example WSDL files 40 with information about the function, the data, the data type and the exchange protocols of the respective web service. Alternatively (not shown in FIG. 1), the registry 10 itself may not contain the WSDL files but rather a reference, where the WSDL file for a certain web service can be found. In any case, if the application 30 intends to send a request to the web service 20, it can contact the registry 10 to obtain the WSDL file 40 and to find out how to access the web service 20.

In addition to descriptions of the web services or references to such descriptions, there may be other metadata relating to the SOA, which may be stored and managed in the registry 10, such as policies and associations between the SOA entities. Further, the registry 10 may hold information about entities specific to the implementing organization. These entities could be elements of the SOA itself, like infrastructure or applications, or entities relating to the processes governing the SOA, like design documents etc.

In one embodiment, a registry may be used, which can be managed with a Java API for XML Registries (JAXR). In this case, there may be registry entries classified as being of a specific type defined by the implementing organization using the JAXR taxonomy ObjectType. Instances of these and the core types can hold additional custom properties. In addition, the registry may include classification capabilities for the entities it describes, that is, the capability to organize categories into hierarchical taxonomies for classifying entities. Further, the registry may include capabilities to define directed relationships between entities. In the case of a registry manageable with JAXR, the relationships may be referred to as associations, wherein the associations themselves are typed and can carry properties.

Figure 2:
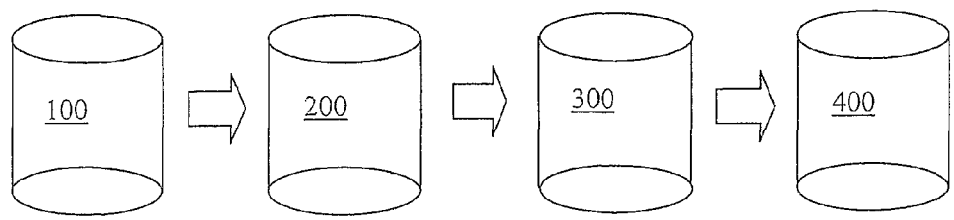
FIG. 2: A schematic representation of the various stages of the lifecycle of a SOA according to one embodiment.

Similar to other large-scale software projects, also a SOA runs through a lifecycle with multiple stages, for example architecture (planning), development, test, and production. The exact number, naming, and intent of the stages depends on the implementing organization. FIG. 2 presents a simplified schematic overview of a possible lifecycle comprising an architectural stage 100, a development 200, a test stage 300 and a production stage 400.

Note that neither all information nor a fixed subset of the information in the registry is affected by this typical lifecycle. On the contrary, only certain metadata concerning a SOA change during the lifecycle stages in a manner which is specific to the implementing organization.

Looking more in detail, the relevant metadata in the registry may not only depend on the above explained lifecycle stages 100-400 but on specific lifecycle states (e.g. designing, design approval, implementing, testing, production handover, productive, retirement). Each lifecycle state may occur in a specific lifecycle stage (e.g. "implementing" in "development", "productive" in "production"), and transitions may only be possible only between certain states (e.g. from "implemented" to "testing", not directly to "productive"). For some SOA implementations, each stage of the lifecycle may even be represented in one or more separate registries requiring the transport of the information between subsequent registries.

In order to provide the organization implementing the SOA with sufficient flexibility, one embodiment allows to choose the object types it wants to manage, the taxonomies for stages and states, and the transitions between states and stages. This may be achieved by introducing a marker taxonomy into the registry, which is exemplary shown in FIG. 3. This taxonomy, named LifecycleParticipants, may include three categories that the implementing organization can use for marking selected objects of the SOA to more effectively manage them during the lifecycle of the SOA and which will be described in the following sections. Introducing the taxonomy into the registry may indicate to a lifecycle management system (LMS), which may be part of an API managing the registry, that this registry is lifecycle-aware.

Figure 3:
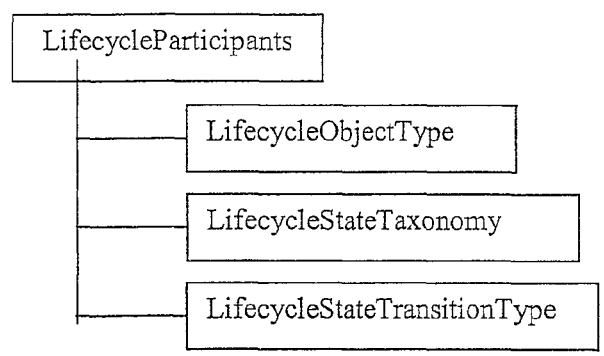
FIG. 3: A schematic overview of the three preferred categories of a lifecycle taxonomy called LifecycleParticipants according to one embodiment.
Figure 4:
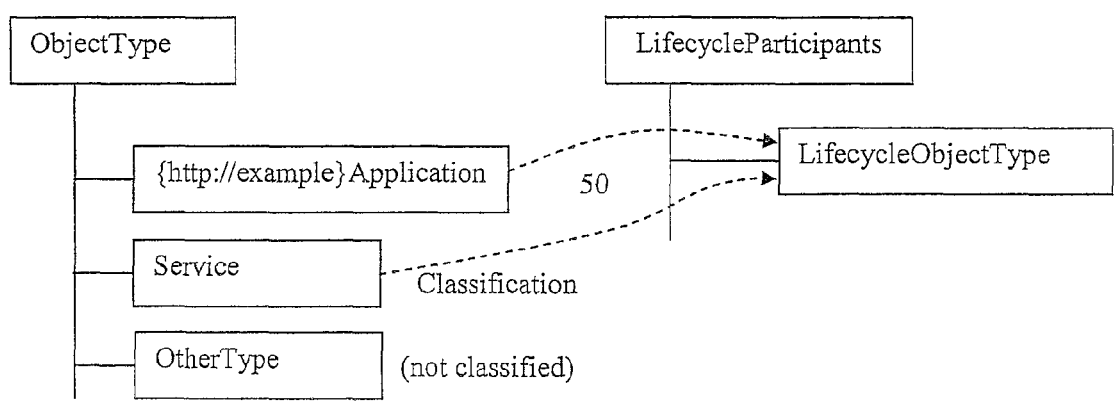
FIG. 4: A schematic diagram illustrating the step of defining object types for the lifecycle taxonomy according to one embodiment.

The first category, LifecycleObjectType of the marker taxonomy LifecycleParticipants shown in FIG. 3 may be used to select and classify in step 50 (cf. FIG. 4) the object types that are managed by the LMS in the sense that they will have a lifecycle state recognized by LMS. These can be standard SOA object types predefined in the registry (like Service) or types introduced by the implementing organization such as groups of services or only a part of a service. Further, also policies contained in a registry or other metadata could be a selected and classified object type of the LMS. FIG. 4 illustrates that not all object types need to be classified for the LMS.

The LMS may use the classifications of the object types to adapt its behavior appropriately to instances of these types, e.g. allow viewing and modifying the lifecycle information using for example a suitable graphical user interface. In one embodiment, an object of a certain object type may be an object comprising a plurality of other objects aggregated into it. If so, each of the aggregated objects may conceptually inherit its lifecycle state from the main object so that its type does not need not be classified as LifecycleObjectType. For example a (web) service usually comprises service bindings, which in turn comprise specification links, wherein the lower elements of this hierarchy automatically inherit the lifecycle state of the respective higher elements.

Figure 5:
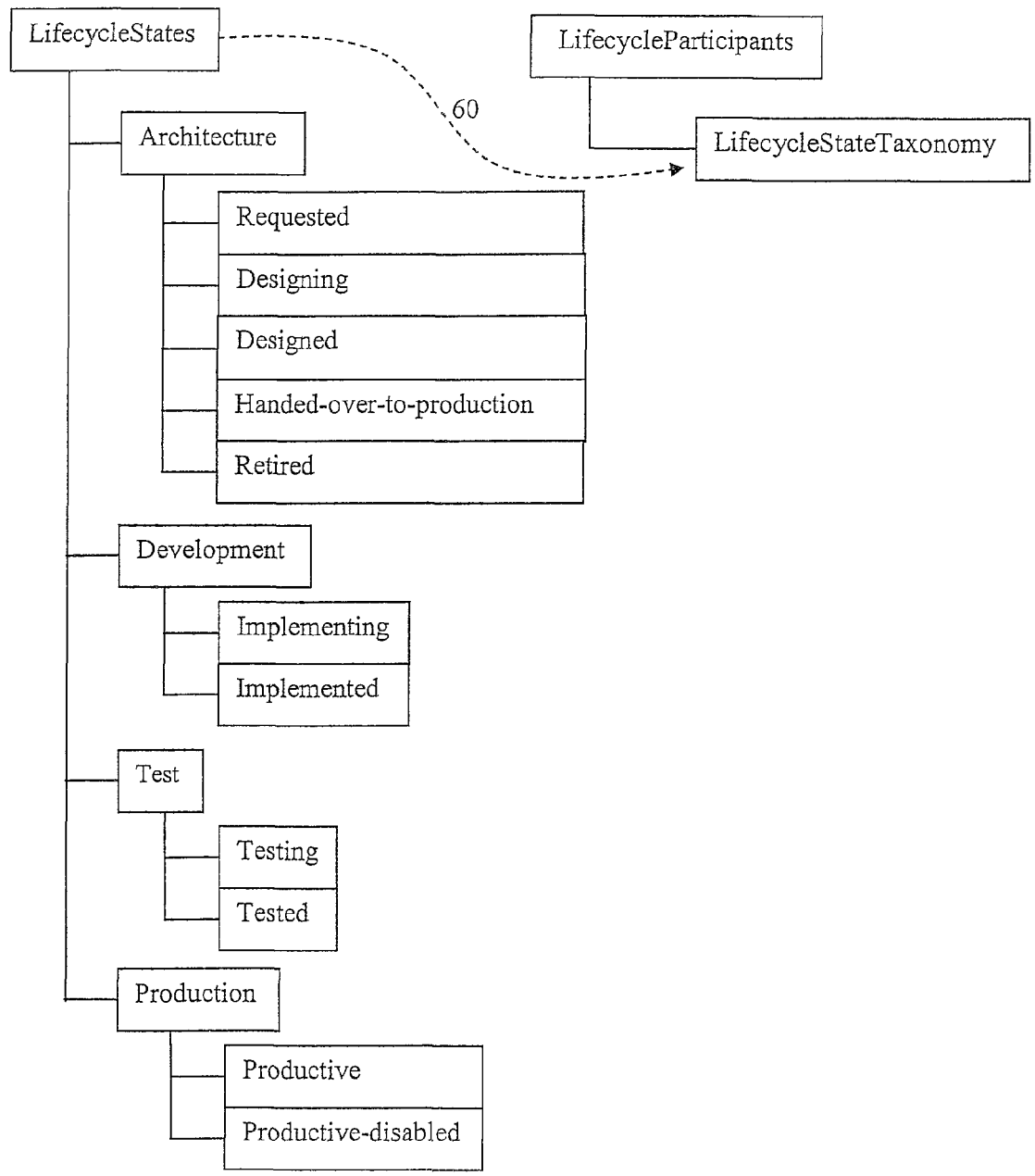
FIG. 5: A schematic diagram illustrating the step of defining lifecycle states for the lifecycle taxonomy according to one embodiment.

The second category of the overall taxonomy LifecycleParticipants of FIG. 3 may be used to mark another taxonomy containing stages and states chosen by the implementing organization. In the example of FIGS. 3 and 5, this taxonomy is called LifecycleStates. As shown in FIG. 5, there might be a plurality of lifecycle stages and states. The various stages and states shown on the left side of FIG. 5 are only to be considered as non-limiting examples. The implementing organization can freely choose and name the taxonomy and the stages and states contained therein. In addition, icons representing the stages and states can be attached to the respective category via external links. In principle, there can be any number of stages and states. The four stages presented here are considered typical for a reasonably elaborate implementation of an SOA.

The dashed arrow 60 shown in FIG. 5 illustrates the classification step of defining which of the stages and stages are actually selected and classified by the implementing organization of the SOA for the LifecycleStates taxonomy. An implementing organization may for example decide that no substantial changes to the relevant metadata of the one or more registries will occur in the SOA during the change from the architecture stage to the development stage and therefore use only one common stage for this part of the overall lifecycle.

In another embodiment (not shown) the lifecycle stages and states may individually depend on the object type or even individual objects. Therefore, one object type or object may have different lifecycle stages and states than another object type or object. This optional feature further increases the flexibility of the described method to exactly adapt to the requirements of the implementing organization of the SOA.

Finally, note that the LifecycleStates taxonomy on its own may not imply a sequence within the states, i.e. a limitation for an object being classified with this taxonomy can freely change from one state to another. This specific issue is addressed with a further category (the third category LifecycleState-TransitionType), which is optional and used as described further below.

Figure 6:
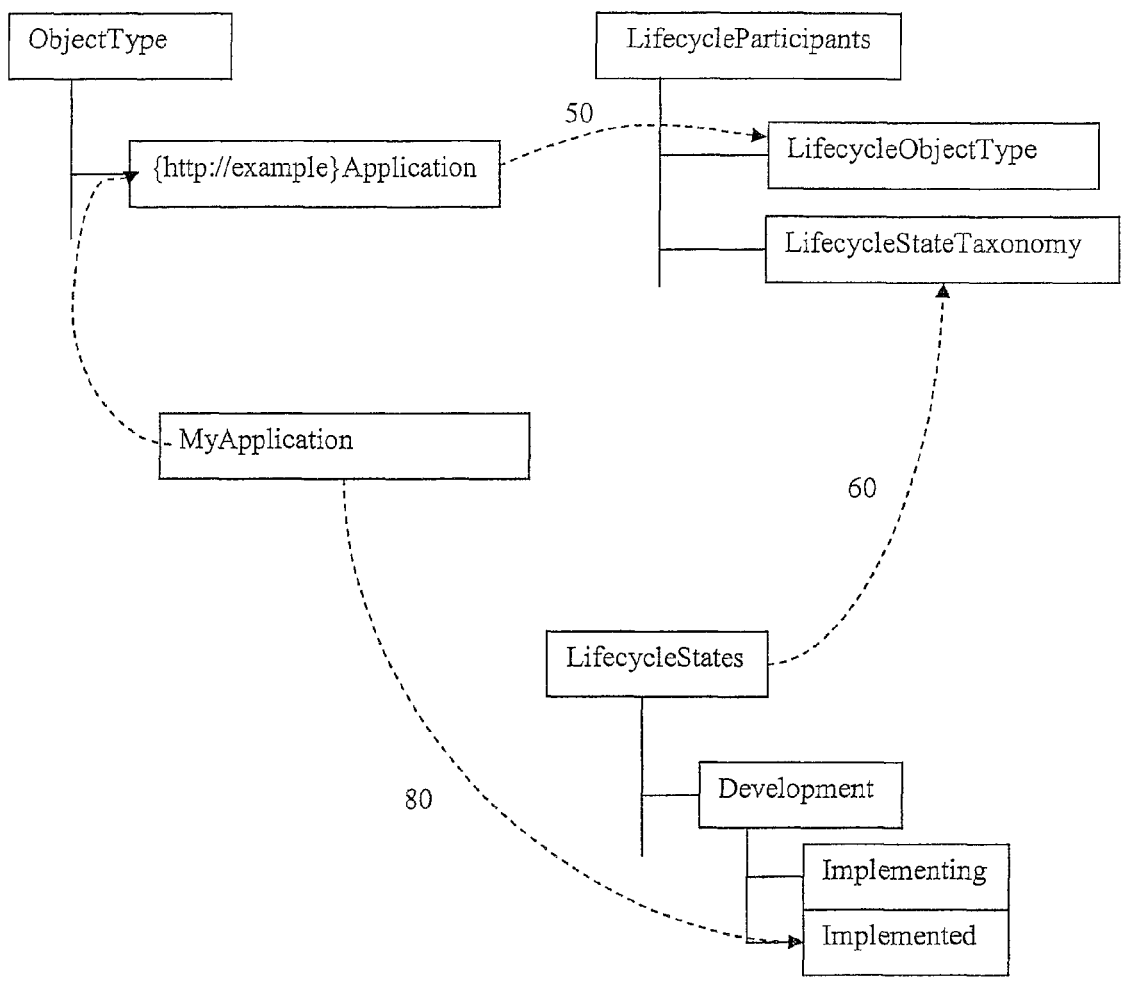
FIG. 6: A schematic diagram illustrating the classification of an instance of a classified object type for a lifecycle management system according to one embodiment.

FIG. 6 illustrates the classification of an instance called "MyApplication" for an LMS of an embodiment of the present invention. As can be seen, the object type "Application" was selected and classified in step 50 as a LifecycleObjectType of the taxonomy LifecycleParticipants. Further, certain stages and states were selected and classified in step 60 as LifecycleStates of the taxonomy LifecycleParticipants. Accordingly, the instance MyApplication can now, at a certain point of time of its real lifecycle, be classified as being implemented (cf. step 80 in FIG. 6). It is important to note that the available classification for MyApplication, both as being an object belonging to the LifecycleObjectType as well as the specific classification of being implemented, is fully customizable in accordance with the requirements of the implementing organization of the SOA.

Figure 7:
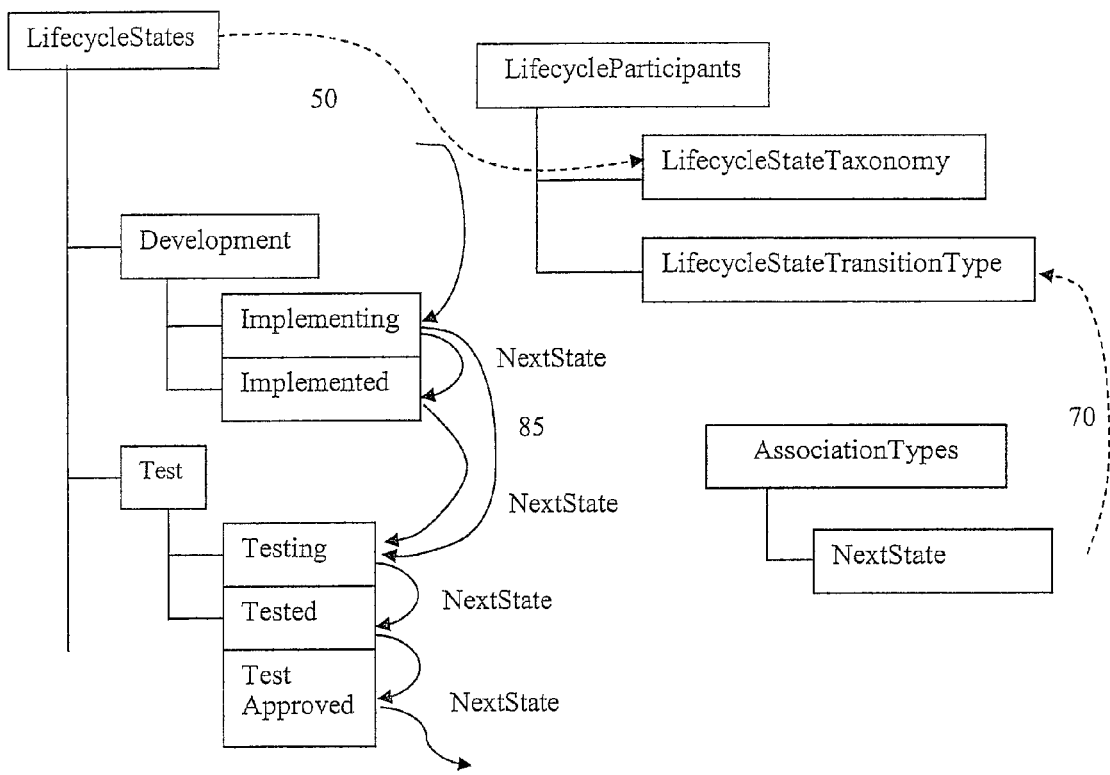
FIG. 7: A schematic diagram illustrating the step of defining the category LifecycleStateTransitionType for the lifecycle taxonomy according to one embodiment.

The category LifecycleStateTransitionType of the marker taxonomy LifecycleParticipants of FIG. 3 may be, in accordance with a further aspect of the described embodiment, used to classify in a step 70 the association type used for expressing state transitions. In the example of FIG. 7, this is the association NextState 85. As can be seen on the left side of FIG. 7, there are NextState associations 85 between the states Implementing, Implemented, Testing, Tested and Test Approved.

The LMS may distinguish between transitions within a stage and between stages. This can be easily determined as each state is represented by a category that hierarchically is placed as sub-category of a stage. The LMS can treat state transitions between stages to imply an export of the information from one stage and an import into a different stage, and can check the validity of the information brought into a registry assigned to a stage based on the associations defined using the LifecycleTransition association type. When importing from a different stage, the LMS can compute an implied state transition based on the state received and the possible transition into a state of this stage.

Through interpreting properties of the state transition associations, the LMS may ensure specific restrictions on state transitions. For example for the states shown in FIG. 7, there is no admissible direct transition from the state Implementing to Tested. Further, in a registry that has role-based user management, the assignment of a role as property of a state transition represented by a NextState association may be interpreted by LMS to restrict this transition to be initiated by users having this role. In the example of FIG. 7, the transition from Tested to Test Approved can be marked to require for example the approval from a user having the role of a SOA Architect. The LMS can thus determine from the defined state transitions whether a state transition can be performed by a given user, or whether a state has been reached for which notification of and approval from a different user is required, and initiate the appropriate actions.

In addition, the NextState association 85 may initiate a process, such as a call of a web service, for example to provide a more advanced approval mechanism for changing from one lifecycle state to another (not shown in FIG. 7).

Further, there could also be a Next association (not shown in FIG. 7), which simply indicates the next state for a given lifecycle state, such as Test Approved for the preceding state Tested. Such an association facilitates the display and the documentation of the lifecycle states of the selected object types of the SOA in a default ordering.

Figure 8:
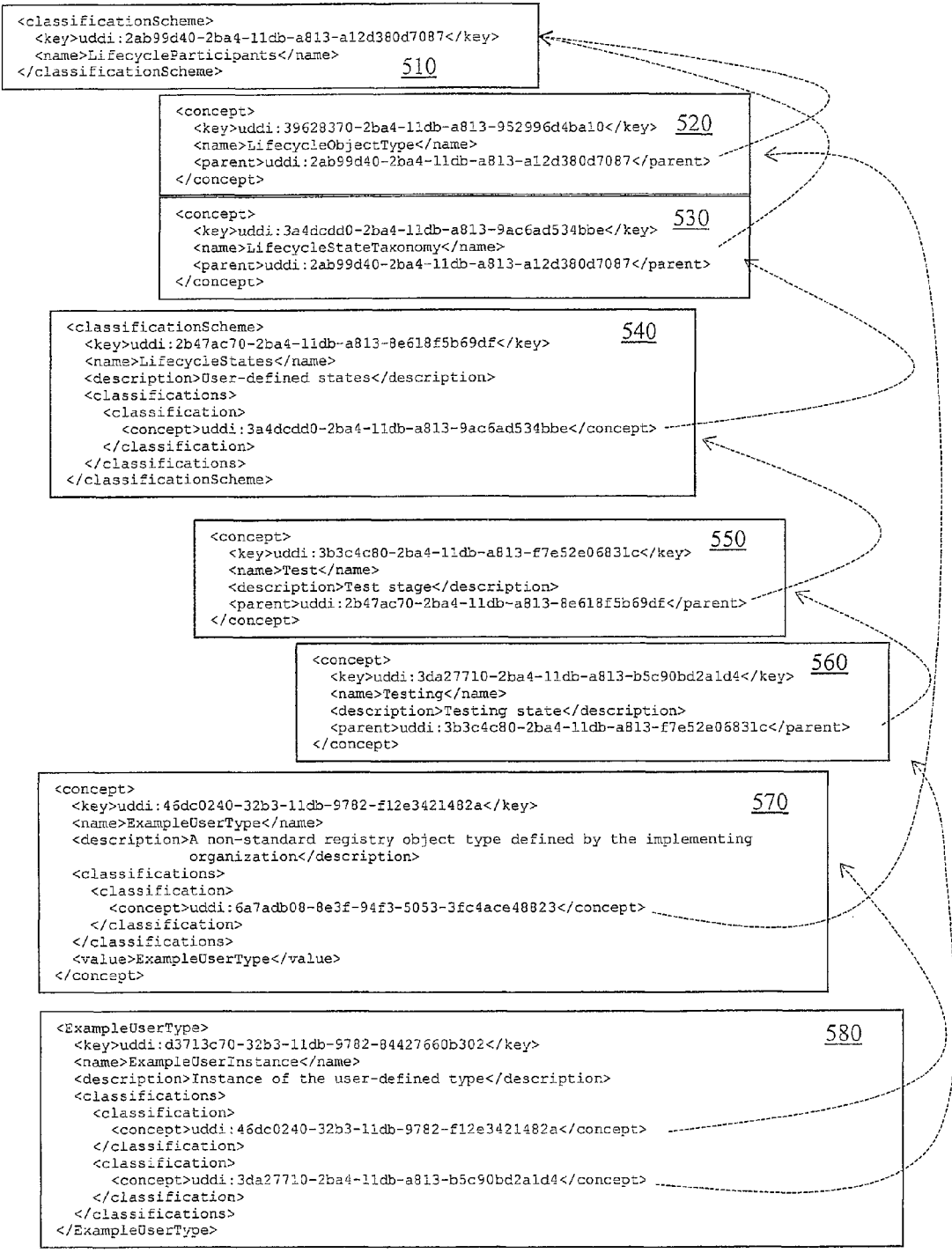
FIG. 8: Exemplary JAXR representations in the form of simplified XML serializations according to one embodiment.

FIG. 8, finally, presents sample objects for the above described embodiments using JAXR representations as simplified XML serializations.

As can be seen, there is the overall ClassificationScheme 510 having, as any entry of the registry, a unique UDDI key. Using this key as a reference, the ClassificationScheme 510 is parent of the above explained two categories LifecycleObjectType and LifecycleStateTaxonomy, which are represented in JAXR as the concepts 520 and 530 (cf. FIG. 8). The two taxonomies may be predefined by the methods and the LMS described herein. By contrast, the specific ClassificationScheme LifecycleStates 540 shown in FIG. 8 can with respect to its structure and name be fully customized by the implementing organization. The reference in 540 to the key of the concept LifecycleStateTaxonomy 530 assures that this Classification scheme is used by the LMS as the taxonomy for the actual states of the lifecycle relevant for the implementing organization.

Two examples of the actual lifecycle stages and states of the ClassificationScheme 540 are the concept 550 for the Test stage and the concept 560 for the Testing state, as they are shown in the center part of FIG. 8. Since the concept 560 refers to a state, it points with its reference of the parent key to the respective stage it belongs to, i.e. the Testing stage 540. This reflects the hierarchy of stages and states as more schematically shown in FIG. 5.

The lower part of FIG. 8 presents an exemplary object type that is managed by the LMS. The concept 570 defines a non-standard registry object type defined by the implementing organization. The classification reference in this concept to the LifecycleObjectType concept 520, au classify this user-defined object type as an object type with a managed lifecycle. The concept 580, finally, presents an instance of such an object type (similar to the instance "MyApplication" of the classified object type "application" in the more schematic diagram of FIG. 6.) This may be reflected by the reference to the object type definition in the concept 570. The additional reference to the Testing state concept 560 indicates that the instance ExampleUserInstance 580 is presently in the testing state.

Although FIG. 8 presents an embodiment of the present invention based on JAXR, it is apparent to the person skilled in the art, that there are a multitude of other techniques for implementing the present invention. The present invention is therefore not limited to this specific API and one or more corresponding registries.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A computer-implemented method for managing the lifecycle of a service oriented architecture (SOA) comprising:
   utilizing a computer to perform:
      defining, in accordance with requirements of an organization implementing the SOA, at least one of a plurality of lifecycle states;
      a. selecting a subset of a plurality of objects of the SOA for lifecycle management in accordance with the requirements of the organization implementing the SOA, wherein the subset is less than the plurality of objects; and
      b. assigning a lifecycle property to each member object of the subset of the plurality of objects of the SOA, wherein the lifecycle property reflects the at least one of the plurality of lifecycle states for the member object;
      storing the lifecycle property for each member object in a memory; and
      using the stored lifecycle property for a first member object to manage the lifecycle of the SOA.

2. The computer-implemented method according to claim 1, wherein a. comprises selecting at least one object type of a plurality of object types of the SOA and wherein b. comprises assigning a lifecycle property to each object of the SOA belonging to the selected object type.

3. The computer-implemented method according to claim 1, wherein the subset selected in a. includes an object comprising an aggregation of objects of the SOA and wherein each aggregated object of the SOA inherits the lifecycle property.

4. The computer-implemented method according to claim 1, further comprising:
   defining, in accordance with the requirements of the organization implementing the SOA, at least one of a plurality of lifecycle stages, wherein each lifecycle stage comprises one or more lifecycle states which is reflected by the lifecycle property.

5. The computer-implemented method according to claim 4, wherein each stage corresponds to a registry comprising objects of the SOA during the respective lifecycle stage.

6. The computer-implemented method according to claim 1, wherein one or more of the lifecycle states for a first object of the selected subset are different from one or more of the lifecycle states for a second object of the selected subset.

7. The computer-implemented method according to claim 1, further comprising:
   defining, in accordance with the requirements of the organization implementing the SOA, at least one of a plurality of transition states reflected by the lifecycle property.

8. The computer-implemented method according to claim 7, wherein the lifecycle property restricts the transition from one state of the lifecycle to the next depending on approval of one or more authorized users of the implementing organization.

9. The computer-implemented method according to claim 7, wherein the lifecycle property causes a process in the SOA during a transition from one state of the lifecycle to another.

10. The computer-implemented method according to claim 1, wherein a. and b. comprise creating a Java Application Programming Interface (API) for Extensible Markup Language (XML) Registries (JAXR) taxonomy for at least one registry of the SOA.

11. A lifecycle management system for managing the lifecycle of a service oriented architecture (SOA) comprising:
   a processor; and a memory coupled to the processor, wherein the memory comprises program instructions executable by the processor to:

define, in accordance with requirements of an organization implementing the SOA, at least one of a plurality of lifecycle states;

select a subset of a plurality of objects of the SOA for lifecycle management in accordance with the requirements of the organization implementing the SOA, wherein the subset is less than the plurality of objects; and assign a lifecycle property to each member of the subset of the plurality of objects of the SOA, wherein the lifecycle property reflects the at least one of the plurality of lifecycle states for the member object;

store the lifecycle property for each member object in the memory; and use the stored lifecycle property for a first member object to manage the lifecycle of the SOA.

12. The Lifecycle management system of claim 11, wherein the program instructions are further executable to implement an Application Programming Interface (API) for managing the objects in one or more registries of the SOA.

13. The Lifecycle management system of claim 11 wherein the program instructions are further executable to implement a graphical user interface displaying lifecycle properties of the selected subset of the pluralities of objects of the SOA.

14. The Lifecycle management system of claim 11, wherein the processor and the memory are in a first computer system, the lifecycle management system further comprising:

a server coupled to the first computer system, wherein the server stores each lifecycle property.

15. A non-transitory computer accessible memory medium comprising program instructions for managing lifecycle of a service oriented architecture (SOA), wherein the program instructions are executable by a processor to:

define, in accordance with requirements of an organization implementing the SOA, at least one of a plurality of lifecycle states;

a. select a subset of a plurality of objects of the SOA for lifecycle management in accordance with the requirements of the organization implementing the SOA, wherein the subset is less than the plurality of objects;

b. assign a lifecycle property to each member of the subset of the plurality of objects of the SOA, wherein the lifecycle property reflects the at least one of the plurality of lifecycle states for the member object;

store the lifecycle property for each member object in a memory; and use the stored lifecycle property for a first member object to manage the lifecycle of the SOA.

16. The non-transitory computer accessible memory medium according to claim 15, wherein a. comprises selecting at least one object type of a plurality of object types of the SOA and wherein b. comprises assigning a lifecycle property to each object of the SOA belonging to the selected object type.

17. The non-transitory computer accessible memory medium according to claim 15, wherein the subset selected in a. includes an object comprising an aggregation of objects of the SOA and wherein each aggregated object of the SOA inherits the lifecycle property.

18. The non-transitory computer accessible memory medium according to claim 15, wherein the program instructions are executable by a processor to:

define, in accordance with the requirements of the organization implementing the SOA, at least one of a plurality of lifecycle stages, wherein each lifecycle stage comprises one or more lifecycle states which is reflected by the lifecycle property.

* * * * *

UNITED STATES PATENT AND TRADEMARK OFFICE
CERTIFICATE OF CORRECTION

PATENT NO.         : 8,239,819 B2
APPLICATION NO.    : 11/766197
DATED              : August 7, 2012
INVENTOR(S)        : Udo Hafermann, Harald Schoning and Ulrich Post It is certified that error appears in the above-identified patent and that said Letters Patent is hereby corrected as shown below:

Column 8, Claim 1, Line 2, delete "managing the lifecycle" and substitute -- managing lifecycle --.

Column 9, Claim 12, Line 18, delete "Lifecycle" and substitute -- lifecycle --.

Column 9, Claim 13, Line 22, delete "Lifecycle" and substitute -- lifecycle --.

Column 9, Claim 14, Line 26, delete "Lifecycle" and substitute -- lifecycle --.

Signed and Sealed this
Twenty-seventh Day of November, 2012

David J. Kappos
*Director of the United States Patent and Trademark Office*